Dec. 31, 1963   F. M. ZINGSHEIM   3,116,076
TELESCOPIC DRAW BARS
Filed April 19, 1961
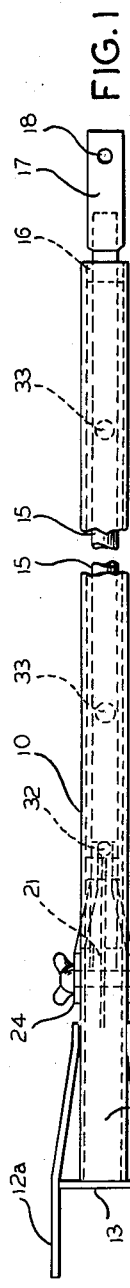
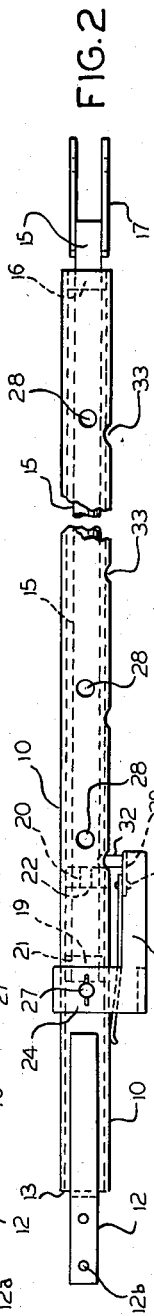
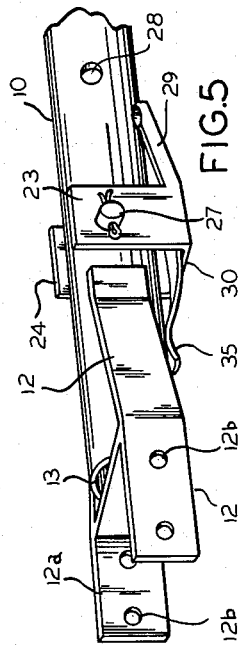
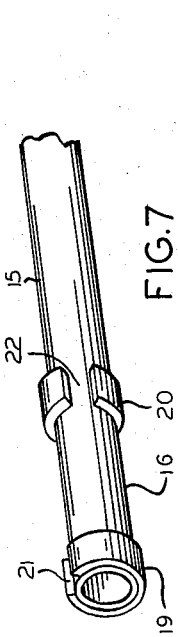
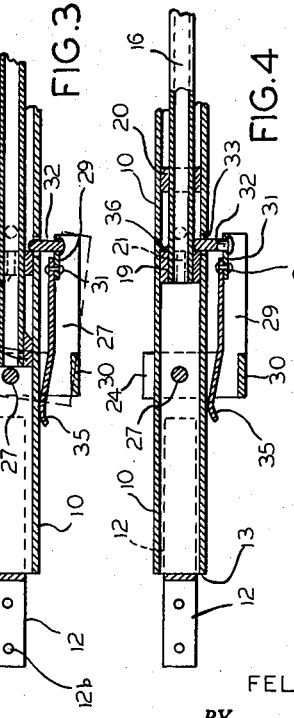
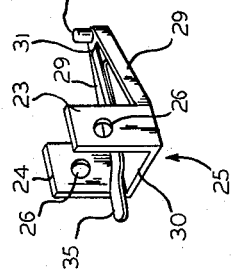
INVENTOR.
FELIX M. ZINGSHEIM
BY
ATTORNEY

United States Patent Office 3,116,076
Patented Dec. 31, 1963

3,116,076
TELESCOPIC DRAW BARS
Felix M. Zingsheim, Theresa, Wis., assignor to Kasten Mfg. Corp., Allenton, Wis., a corporation of Wisconsin
Filed Apr. 19, 1961, Ser. No. 104,170
4 Claims. (Cl. 280—482)

This invention relates to draw bars, and particularly to a draw bar that may be readily adjusted to various lengths.

A principal object of the invention is to provide an adjustable draw bar characterized by an outer draw bar member having an adjustable abutment thereon, and an inner telescoping draw bar member constrained between abutment members of the adjustable abutment and removable from between such abutment when desired.

Another object is to provide a pair of telescoping draw bar members which may be adjusted to a desired total length by varying the telescoping relation of the two, and for providing a ready disconnect between the two as desired.

Still another object comprehends the provision of two telescoping draw bar members, one of which is removable from telescoping engagement from the other by rotative and translative movement thereof.

Other and further objects of the invention will be apparent from a description following, when taken with the drawing, in which:

FIG. 1 is a top view of a draw bar constructed in accordance with the present invention;

FIG. 2 is a side elevation view thereof;

FIG. 3 is a fragmentary longitudinal cross-section thereof;

FIG. 4 is a view similar to FIG. 3, showing the manner in which the draw bar members are disconnected;

FIG. 5 is a perspective view showing structure for attaching one end of the draw bar to a draft vehicle;

FIG. 6 is a perspective view of an adjustable abutment adapted to be supported on one of the draw bar members; and FIG. 7 is a perspective view of one of the draw bar members showing spaced abutment members thereon adapted to cooperate with the abutment member of FIG. 7.

Referring now the the drawing, the improved draw bar according to the present invention includes a first hollow cylindrical draw bar member 10 provided with coupling arms 12 extending along draw bar member 10 and spaced parallel extensions 12a which are spaced as shown by a transverse member 13 also welded to the end of the draw bar member 10. Suitable aligned openings 12b cooperate with a pin, not shown, for connecting the draw bar member 10 to a draft vehicle, not shown.

A second draw bar member 15 telescopes within the first draw bar member 10, and a ferrule 16 at the end of draw bar member 10 guides second draw bar member 15 within member 10. Structure is provided for attaching second draw bar member 15 to a draft vehicle and includes a clevis 17 having aligned holes for a securing pin, not shown.

The second draw bar member 15 is provided with two spaced collars 19 and 20. Collar 19 is secured to the inner end of member 15 and has an axially extending slot 21 therein. Collar 20 is spaced from collar 19 and has an axially extending slot 22 which is angularly spaced by 90° from slot 21 in collar 19.

Collars 19 and 20 cooperate with a combination latch and abutment device 25 which can be adjusted in position on first draw bar member 10. Device 25 has spaced arms 23 and 24 flanking member 10 and provided with aligned holes 26 receiving a pin 27 which also extends through aligned holes 28 in draw bar member 10, the aligned holes 28 being spaced along the length of member 10.

Arms 23 and 24 are connected to converging body members 29 extending along the bottom of member 10, and body members 29 are connected by transverse member 30 connected to the lower ends of arms 23 and 24. The body members 29 are joined at their ends remote from arms 23 and 24 by a web 31 which supports an upstanding pin 32 adapted to enter an aperture 33 in the lower side of member 10.

As seen particularly in FIGS. 1 and 2, the apertures 33 are spaced along the draw bar member 10.

The web 31 supports a leaf spring 35 held at one end by a rivet 34 to the web 31, the other end of the spring 35 bearing against draw bar member, and operable to rock the abutment member to a position to maintain pin 32 in opening 33.

The collar 20 on second draw bar member 15 is moved past pin 32 by rotating member 15 so that slot 21 registers with pin 32 extending through hole 33. When member 15 is rotated through 90° slot 22 registers with pin 32 so that further translative movement of second draw bar member 15 is had with respect to first draw bar member 10. Upon return rotative movement the two collars 19 and 20 are held between pin 32 and pin 27. The position of abutment member 25 thus determines the working length of the draw bar assembly.

To disassemble the connection for lengthening the bar, second draw bar member 15 is rotated as before to align slot 22 with pin 32. Preferably, collar 19 has a beveled surface 36 so that collar 19 can move past pin 32, it rocking out of position against the bias of spring 35.

The abutment 25 can be relocated on draw bar member 10, and the sequence of operations repeated for a new draw bar length.

In the event that it is desired to completely separate draw bar member 10 and 15, draw bar member 10 will not have the guide ferrule 16.

Although I have shown a specific construction and arrangement of the parts constituting my invention, I am fully aware that many changes in the form, shape, contour, and arrangement of the parts may be made without effecting their operativeness, and I reserve the right to make such changes, without departing from the spirit of my invention or the scope of the claims.

Having thus described my invention, what I claim and desire to secure by Letters Patent in the United States is:

1. An adjustable draw bar comprising a first draw bar member and a second draw bar member, said draw bar members being in telescoping relationship and said second draw bar member telescoping within said first draw bar member, an adjustable abutment member supported on said first draw bar member including a pin connection between said abutment member and said first draw bar member, a plurality of spaced apertures in said first draw bar member adapted to receive said pin connection to adjust the position of said abutment member, a plurality of openings in said draw bar member disposed in a plane normal to the plane of said spaced apertures, a pin carried by said abutment including a spring acting between said abutment and said first draw bar member for rocking the abutment to a position where said pin extends within said first draw bar member, a pair of spaced collars on the inner end of said second draw bar member adapted to be held between said pin connection and said abutment supported pin, and means enabling said collars to move past said abutment supported pin comprising an axial slot in said endmost collar and an axial slot in the other of said collars and spaced 90° from the slot of said other collar.

2. An adjustable draw bar comprising a first draw bar member and a second draw bar member, said draw bar members being in telescoping relationship and said second draw bar member telescoping within said first draw bar member, an adjustable abutment member mounted on said first draw bar member including a connection between said abutment member and said first draw bar member, means providing adjustment of the connection of said abutment to said first draw bar member, a plurality of openings in said first draw bar member, a pin carried by said abutment including a spring acting between said abutment and said first draw bar member for rocking the abutment to a position where said pin extends through said openings into said first draw bar member, a pair of spaced collars on the inner end of said second draw bar member adapted to be held between said pin and said connection, and means enabling said collars to move past said abutment supported pin comprising an axial slot in said endmost collar and an axial slot in the other of said collars and spaced 90° from the slot of said other collar.

3. An adjustable draw bar comprising a first draw bar member and a second draw bar member, said draw bar members being in telescoping relationship and said second draw bar member telescoping within said first draw bar member, an adjustable member mounted on said first draw bar member including a connection between said adjustable member and said first draw bar member, means providing adjustment of the connection of said adjustable member to said first draw bar member, a plurality of openings in said first draw bar member, a pin carried by said adjustable member including a spring acting between said adjustable member and said first draw bar member for rocking the adjustable member to a position where said pin extends through said openings into said first draw bar member, means on the inner end of said second draw bar member adapted to be held between said pin and said connection, and means enabling said last named means to move past said pin comprising slots in said last named means spaced 90° from each other.

4. An adjustable draw bar comprising a first draw bar member and a second draw bar member, said draw bar members being in telescoping relationship and said second draw bar member telescoping within said first draw bar member, an adjustable member mounted on said first draw bar member including a connection between said adjustable member and said first draw bar member, means providing adjustment of the connection of said adjustable member to said first draw bar member, a plurality of openings in said first draw bar member, a pin carried by said adjustable member including a spring acting between said adjustable member and said first draw bar member for rocking the adjustable member to a position where said pin extends through said openings into said first draw bar member, means on the inner end of said second draw bar member adapted to be held between said pin and said connection, said means on the inner end of the second draw bar member comprising a collar spaced from the end of said second draw bar member and having a slot therein, said means on the inner end of said second draw bar member further including a second collar at the end of the second draw bar member having a tapered surface thereon, said second draw bar member being adapted to be turned to a position to enable said pin to move relative to said draw bar member in said slot, and said tapered surface enabling said pin to be displaced against the force of said spring.

References Cited in the file of this patent
UNITED STATES PATENTS

| | | |
|---|---|---|
| 2,591,312 | Stees | Apr. 1, 1952 |
| 3,014,738 | Kasten | Dec. 26, 1961 |